(12) United States Patent
Kim et al.

(10) Patent No.: US 10,839,483 B2
(45) Date of Patent: Nov. 17, 2020

(54) METHOD OF CONVERTING LOW-RESOLUTION IMAGE TO HIGH-RESOLUTION IMAGE AND IMAGE CONVERSION DEVICE PERFORMING METHOD

(71) Applicant: Korea Advanced Institute of Science and Technology, Daejeon (KR)

(72) Inventors: Munchurl Kim, Daejeon (KR); Jae Seok Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 417 days.

(21) Appl. No.: 15/741,098

(22) PCT Filed: Jun. 30, 2016

(86) PCT No.: PCT/KR2016/007080
§ 371 (c)(1),
(2) Date: Apr. 30, 2018

(87) PCT Pub. No.: WO2017/003240
PCT Pub. Date: Jan. 5, 2017

(65) Prior Publication Data
US 2018/0232853 A1 Aug. 16, 2018

(30) Foreign Application Priority Data

Jun. 30, 2015 (KR) .................. 10-2015-0093643
Jun. 30, 2016 (KR) .................. 10-2016-0082526

(51) Int. Cl.
*G06K 9/32* (2006.01)
*G06T 3/40* (2006.01)
*H04N 7/01* (2006.01)

(52) U.S. Cl.
CPC ............ *G06T 3/403* (2013.01); *G06T 3/4007* (2013.01); *G06T 3/4053* (2013.01); *H04N 7/01* (2013.01);
(Continued)

(58) Field of Classification Search
CPC ..... G06T 3/403; G06T 3/4053; G06T 3/4007; H04N 7/0117; H04N 7/0145; H04N 7/01
(Continued)

(56) References Cited

U.S. PATENT DOCUMENTS

2002/0172434 A1* 11/2002 Freeman ............... G06T 3/4053
382/299
2010/0232729 A1* 9/2010 Peleg ..................... G06T 11/60
382/298
2011/0221966 A1 9/2011 Hsieh

FOREIGN PATENT DOCUMENTS

JP 09-294204 A 11/1997
JP 2001-028051 A 1/2001
(Continued)

OTHER PUBLICATIONS

Freeman, William T., Thouis R. Jones, and Egon C. Pasztor. "Example-based super-resolution." IEEE Computer graphics and Applications 22.2 (2002): 56-65. (Year: 2002).*
(Continued)

*Primary Examiner* — Andrew M Moyer
(74) *Attorney, Agent, or Firm* — Fenwick & West LLP

(57) ABSTRACT

An image conversion method includes: dividing a low-resolution image to generate a plurality of low-resolution image patches having N (N being a natural number of 2 or greater) number of pixels; classifying the low-resolution image patches into a plurality of image categories; converting the low-resolution image patches by using a conversion kernel for each image patch corresponding to its image
(Continued)

category among prestored conversion matrices, to generate high-resolution image patches having L (L being a natural number) number of pixels, which is less than the N number of pixels; and arranging the high-resolution image patches to generate a high-resolution image. According to the image conversion method, an operation amount can be reduced compared with a conventional technique, and thus the image conversion method can be implemented in hardware having low complexity. A high quality and high-resolution image can be generated regardless of characteristic information of an image signal.

19 Claims, 8 Drawing Sheets

(52) U.S. Cl.
CPC ......... *H04N 7/0117* (2013.01); *H04N 7/0145* (2013.01)

(58) Field of Classification Search
USPC ......................................................... 382/299
See application file for complete search history.

(56) References Cited

FOREIGN PATENT DOCUMENTS

| KR | 10-2005-0090920 | 9/2005 |
| KR | 10-2009-0050929 | 5/2009 |
| KR | 10-2010-0025805 | 3/2010 |

OTHER PUBLICATIONS

Choi, J.-S., et al., "Super-Interpolation With Edge-Orientation—Based Mapping Kernels for Low Complex 2× Upscaling," IEEE Transactions on Image Processing, Dec. 9, 2015, pp. 469-483, vol. 25, No. 1.

* cited by examiner

FIG.5

$$V = \begin{bmatrix} 1 & 1 \\ -1 & -1 \end{bmatrix}$$

$$H = \begin{bmatrix} -1 & 1 \\ -1 & 1 \end{bmatrix}$$

301

| $P_{11}$ 1 | $P_{12}$ 1 | $P_{13}$ |
| -1 | -1 | |
| $P_{21}$ | $P_{22}$ | $P_{23}$ |
| $P_{31}$ | $P_{32}$ | $P_{33}$ |

301

| $P_{11}$ -1 | $P_{12}$ 1 | $P_{13}$ |
| -1 | 1 | |
| $P_{21}$ | $P_{22}$ | $P_{23}$ |
| $P_{31}$ | $P_{32}$ | $P_{33}$ |

METHOD OF CONVERTING LOW-RESOLUTION IMAGE TO HIGH-RESOLUTION IMAGE AND IMAGE CONVERSION DEVICE PERFORMING METHOD

FIELD OF THE INVENTION

The present invention relates to an image conversion device and an image conversion method thereof; and, more particularly, to an image conversion device and an image conversion method thereof which converts a low-resolution image to a high-resolution image having a relatively high resolution.

BACKGROUND OF THE INVENTION

As well known, a process of converting a low-resolution image to a high-resolution image having a relatively high resolution is referred to as super resolution or up-scaling.

In a conventional technique, a low-resolution image is expanded and converted to a high-resolution image by an interpolation process such as bicubic or the like. Also, a high-resolution image having a low image quality can be repeatedly improved by using a floating point conversion kernel such as a floating-point matrix, so that a high-resolution image with a high image quality is finally generated.

However, in the conventional technique, the interpolation process is required for low-resolution images and a large number of operations are required because the floating point conversion kernel is used. Therefore, it is difficult to implement the conventional technique in a hardware having low complexity.

In addition, a high-resolution image having a satisfactory high quality cannot be generated from a low-resolution image having specific image signal characteristics since characteristic information such as an edge, a texture or the like of an image signal is not used or insufficiently used.

SUMMARY OF THE INVENTION

In view of the above, the present invention provides an image conversion device and an image conversion method which convert a low-resolution image to a high-resolution image without an interpolation process for a low-resolution image and repetitive image quality improving processes.

The object of the present invention is not limited to the above-described object and other objects that are not mentioned will be clearly understood by those skilled in the art to which the present invention pertains.

In accordance with a first aspect of the present invention, there is provided an image conversion method using an image conversion device for converting a low-resolution image to a high-resolution image having a relatively high resolution. The image conversion method includes the steps of: generating a plurality of low-resolution image patches having N (N being a natural number of 2 or greater) number of pixels by dividing the low-resolution image; classifying the plurality of low-resolution image patches into a plurality of image categories; generating a plurality of high-resolution image patches having L (L being a natural number) number of pixels, which is less than the N number of pixels, by converting the plurality of low-resolution image patches by using a conversion kernel for each image patch corresponding to its image category among a plurality of prestored conversion matrices; and generating the high-resolution image by arranging the plurality of high-resolution image patches.

In the step of classifying the plurality of low-resolution image patches, the plurality of low-resolution image patches may be classified by using at least one information among an edge direction, an edge intensity, a texture, a brightness, a first- or higher-order differential signal, a color, a type of an object, and a frequency of the low-resolution image patches.

The classifying the plurality of low-resolution image patches may include: classifying the N number of pixels included in the low-resolution image patches into a plurality of pixel groups; determining a direction category of an edge direction of each of the pixel groups among a plurality of preset direction categories; and classifying the low-resolution image patches into one of the plurality of image categories based on the determined direction categories of the pixel groups.

Some of the N number of pixels may be duplicately classified into different pixel groups among the plurality of pixel groups.

In the step of determining a direction category, an edge filter may be used.

The edge filter may include a vertical pixel conversion matrix and a horizontal pixel conversion matrix.

In the step of determining a direction category, the direction category may be determined among a horizontal category, a vertical category, a first diagonal category traversing a first quadrant and a third quadrant on an orthogonal coordinate plane having a horizontal direction and a vertical direction orthogonal to each other, a second diagonal category traversing a second quadrant and a fourth quadrant on the orthogonal coordinate plane, and a non-directional category having no directionality by using the vertical pixel conversion matrix and the horizontal pixel conversion matrix.

In the step of determining a direction category, a magnitude value and an angle value of the edge direction may be calculated and, then, the direction category may be determined to be the non-directional category when the magnitude value is smaller than a preset threshold value and determined among the horizontal category, the vertical category, the first diagonal category and the second diagonal category depending on the angle value when the magnitude value is greater than or equal to the threshold value.

In the step of classifying the plurality of low-resolution image patches, the N number of pixels may be classified into a first to a fourth pixel group; the direction categories of the first to the fourth pixel group are determined; and the low-resolution image patches are classified into one of 625 image categories by using a quinary notation.

The low-resolution image patches to be converted by using the conversion kernels may have an original size before expansion.

The plurality of conversion kernels may be calculated by using pairs of training image patches corresponding to the low-resolution image patches and correct image patches corresponding to the high-resolution image patches, wherein the training image patches have an original size before expansion.

The plurality of conversion kernels may be a linear conversion matrix or a non-linear conversion matrix.

In the step of generating the plurality of high-resolution image patches, pixel values of the high-resolution image patches may be calculated by multiplying the linear conversion matrices of integer values to the low-resolution image patches and performing bit shift operations.

In the step of generating the high-resolution image, when the N number of pixels included in the low-resolution image patches are superimposed over the high-resolution image, the L number of pixels included in the high-resolution image patches may be arranged around a central pixel among the N number of pixels.

In the step of generating the high-resolution image, when the N is 9 and the L is 4, the low-resolution image patches have a 3×3 polygonal shape and the high-resolution image patches may have a 2×2 polygonal shape.

In the step of generating the high-resolution image, the high-resolution image may be generated by arranging the plurality of high-resolution image patches without overlapping.

In accordance with a second aspect of the present invention, there is provided a computer program stored in a computer-readable storage medium which causes a processor to perform the image conversion method described above.

In accordance with a third aspect of the present invention, there is provided a computer-readable storage medium storing a computer program for causing a processor to perform the image conversion method described above.

In accordance with a fourth aspect of the present invention, there is provided an image conversion device for converting a low-resolution image to a high-resolution image having a relatively high resolution. The image conversion device includes: an input unit into which the low-resolution image is inputted; a processing unit configured to generate the high-resolution image by converting the inputted low-resolution image; and an output unit configured to output the generated high-resolution image, wherein the processing unit generates a plurality of low-resolution image patches having an N (N being a natural number of 2 or greater) number of pixels by dividing the low-resolution image, classifies the plurality of low-resolution image patches into a plurality of image categories, generates a plurality of high-resolution image patches having an L (L being a natural number) number of pixels, which is less than the N number of pixels, by converting the plurality of low-resolution image patches by using a conversion kernel for each image patch corresponding to its image category among a plurality of prestored conversion matrices, and generates the high-resolution image by arranging the plurality of high-resolution image patches.

The processing unit may generate the high-resolution image by arranging the plurality of high-resolution image patches without overlapping.

Effect of the Invention

In accordance with the embodiments of the present invention, a low-resolution image is directly converted to a high-resolution image without an interpolation process for a low-resolution image and repetitive image quality improving processes. Therefore, the amount of operations is reduced compared to the conventional technique in which the interpolation process is required. Accordingly, the technique of the present invention can be implemented in a hardware having low complexity.

Since the low-resolution image is classified into the plurality of image categories based on the characteristic information and then converted to the high-resolution image by using an integer conversion kernel selected for each category, the amount of operations can be further reduced.

When generating the high-resolution image by arranging a plurality of high-resolution image patches, by arranging the high-resolution image patches adjacent to each other without overlapping, an additional operation such as calculation of pixel values for an overlap region or the like is not required. Accordingly, the amount of operations can be further reduced.

Since the low-resolution image is classified into the plurality of image categories based on the characteristic information and then converted to the high-resolution image by using the conversion kernel selected for each image category, the high-resolution image having a high quality can be generated regardless of the characteristic information of the image signal.

BRIEF DESCRIPTION OF THE DRAWINGS

FIG. 5 shows a vertical pixel conversion matrix V and a horizontal pixel conversion matrix H applied to low-resolution image patches obtained by dividing a low-resolution image in accordance with the embodiment of the present invention.

DETAILED DESCRIPTION OF THE EMBODIMENTS

The advantages and features of embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to disclose the invention and also to allow those skilled in the art to know the scope of the present invention. Therefore, the present invention is to be defined only by the scope of the appended claims.

In the following description, well-known functions and/or configurations will not be described in detail if they would unnecessarily obscure the features of the invention. Further, the terms to be described below are defined in consideration of their functions in the embodiments of the invention and may vary depending on a user's or an operator's intention or practice. Accordingly, the definitions of the terms may be made on a basis of the content throughout the specification.

Figure 1:
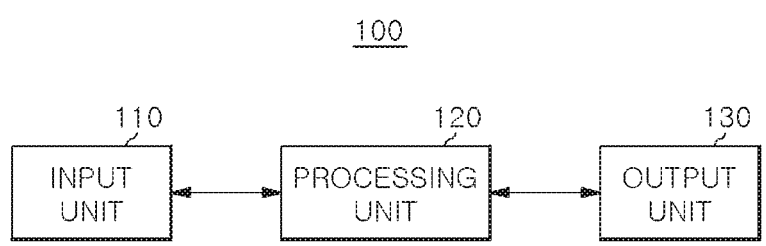
FIG. 1 is a block diagram of an image conversion device capable of performing an image conversion method according to an embodiment.
Figure 2:
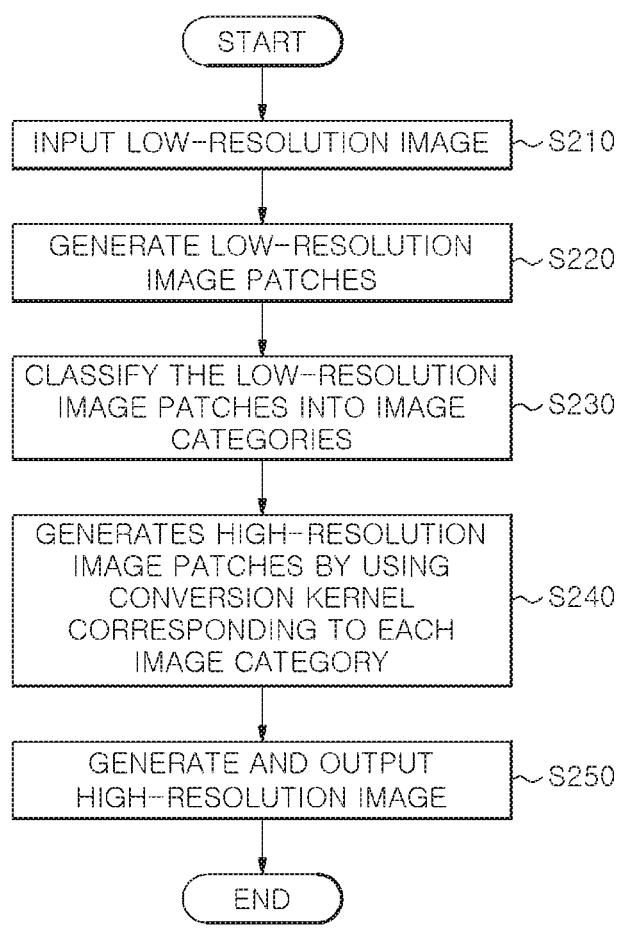
FIG. 2 is a flowchart for explaining the image conversion method according to the embodiment.
Figure 3:
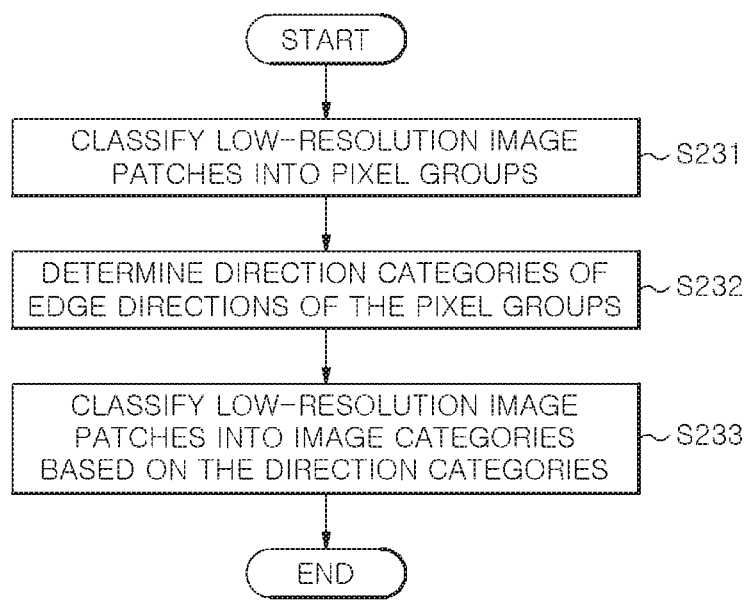
FIG. 3 is a flowchart for explaining a process of classifying an image category by using edge direction information in accordance with the embodiment of the present invention.

FIG. 1 is a block diagram of an image conversion device capable of performing an image conversion method according to an embodiment.

As shown in FIG. 1, an image conversion device 100 according to an embodiment includes an input unit 110, a processing unit 120 and an output unit 130.

The input unit 110 receives a low-resolution image and provides the low-resolution image to the processing unit 120. For example, the input unit 110 may be configured as various communication interfaces such as a serial port, a USB (Universal Serial Bus) port and the like or as a receiver capable of receiving a data stream.

The processing unit 120 performs a process of converting the low-resolution image provided from the input unit 110 to a high-resolution image. The processing unit 120 may be configured as a processor such as a central processing unit or the like.

The processing unit 120 generates a plurality of low-resolution image patches having N (N being a natural number of 2 or greater) number of pixels by dividing the low-resolution image, andclassifies the plurality of low-resolution image patches into a plurality of image categories. Then, a plurality of high-resolution image patches having L (L being a natural number) number of pixels, which is less than the N number of pixels, is generated by converting the plurality of low-resolution image patches by using a conversion kernel for each image patch corresponding to its image category among a plurality of prestored conversion matrices. Further, a high-resolution image is generated by arranging the plurality of high-resolution image patches.

The processing unit 120 can classify the plurality of low-resolution image patches into the plurality of image categories by using at least one information among an edge direction, an edge intensity, a texture, a brightness, a first- or higher-order differential signal, a color, a type of an object, and a frequency of the low-resolution image patches.

For example, the processing unit 120 can classify the image categories by using edge direction information. In that case, the N number of pixels included in the low-resolution image patches are classified into a plurality of pixel groups. At this time, some of the N number of pixels may be duplicately classified into different pixel groups among the plurality of pixel groups. Then, direction categories of edge directions of the pixel groups are determined among a plurality of preset direction categories. The low-resolution image patches are classified into one of the plurality of image categories based on the determined direction categories of the pixel groups.

The processing unit 120 may use an edge filter including a vertical pixel conversion matrix and a horizontal pixel conversion matrix to determine the direction categories of the pixel groups.

For example, the processing unit 120 can determine the direction categories of edge direction components of the pixel groups by using the vertical pixel conversion matrix and the horizontal pixel conversion matrix while setting five direction categories. The five direction categories may include a horizontal category, a vertical category, a first diagonal category traversing a first quadrant and a third quadrant on an orthogonal coordinate plane having a horizontal direction and a vertical direction orthogonal to each other, a second diagonal category traversing a second quadrant and a fourth quadrant on the orthogonal coordinate plane, and a non-directional category having no directionality.

For example, the processing unit 120 may use a preset threshold value when determining the direction category of the pixel group. A magnitude value and an angle value of the edge direction are calculated. When the magnitude value is smaller than the preset threshold value, the direction category may be determined to be the non-directional category. On the contrary, when the magnitude value is greater than or equal to the threshold value, the direction category may be determined among the horizontal category, the vertical category, the first diagonal category and the second diagonal category depending on the angle value.

When the processing unit 120 converts a plurality of low-resolution image patches by using a conversion kernel for each image patch corresponding to its image category among a plurality of prestored conversion matrices, a linear conversion matrix or a non-linear conversion matrix may be used as the conversion kernel. Here, the size of the low-resolution image patches used by the conversion kernel may be the original size before the expansion. A plurality of conversion kernels used by the processing unit 120 may be obtained through a separate training process. The processing unit 120 can calculate a plurality of conversion kernels through training using pairs of training image patches corresponding to the low-resolution image patches and correct image patches corresponding to the high-resolution image patches. Here, the size of the training image patch used by the processing unit 120 may be the original size before the expansion. The original size before the expansion may indicate that the interpolation process has not been performed.

The processing unit 120 can generate a high-resolution image by arranging the plurality of high-resolution image patches without overlapping. Here, when the N number of pixels included in the low-resolution image patches are superimposed over the high-resolution image, the L number of pixels included in the high-resolution image patches may be arranged around the central pixel among the N number of pixels.

The output unit 130 constituting the image conversion device 100 according to an embodiment outputs the high-resolution image generated by the processing unit 120. For example, the output unit 130 can be configured as various communication interfaces such as a serial port, a USB port and the like or as an image display device capable of displaying a high-resolution image on a screen.

Hereinafter, the image conversion method of converting a low-resolution image to a high-resolution image having a relatively high resolution by using the image conversion device according to the embodiment will be described with reference to FIGS. 1 to 8.

First, the input unit 110 of the image converting device 100 receives a low-resolution image and provides the low-resolution image to the processing unit 120 of the image conversion device 100 (S210).

Figure 4:
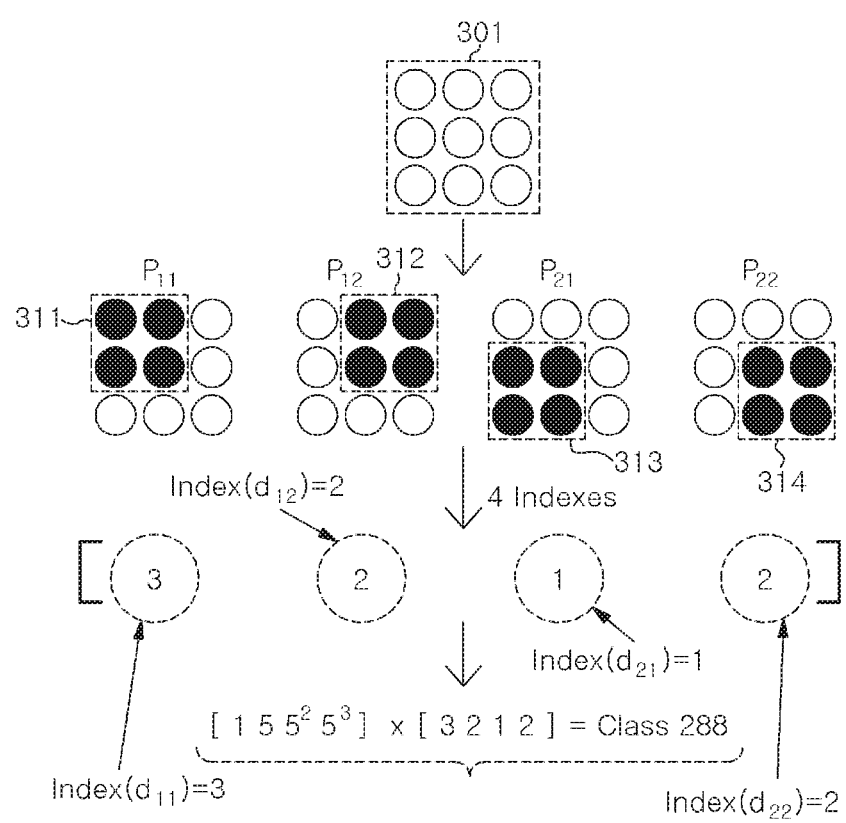
FIG. 4 is a flowchart for explaining a process of determining a direction category by using the edge direction information in accordance with the embodiment of the present invention.

Then, the processing unit 120 generates a plurality of low-resolution image patches having N (N being a natural number of 2 or greater) number of pixels by dividing the low-resolution image received from the input unit 110 (S220). For example, the processing unit 120 can generate a plurality of low-resolution image patches having nine pixels. In other words, the low-resolution image can be divided into 3×3 polygonal low-resolution image patches 301, as shown in FIG. 4.

Then, the processing unit 120 classifies the plurality of low-resolution image patches into a plurality of image categories by using characteristic information (S230). The number of image categories is previously determined through a training process using pairs of training image patches corresponding to low-resolution image patches and correct image patches corresponding to high-resolution image patches. The image categories are classified based on at least one information among an edge direction, an edge intensity, a texture, a brightness, a first- or higher-order differential signal, a color, a type of an object, and a frequency of the low-resolution image patches. Alternatively, the processing unit 120 may classify the plurality of low-resolution image patches into a plurality of image categories by using a known k-mean clustering algorithm. In that case, the k-mean clustering algorithm may be performed by a 30-dimensional feature vector using PCA (Principal Component Analysis).

The processing unit 120 may classify the image categories by using the edge direction information. In that case, the processing unit 120 divides the N number of pixels included in the low-resolution image into the L number of pixels and classifies them into a plurality of pixel groups (S231). At this time, some of the N number of pixels may be duplicately classified into different pixel groups among the plurality of pixel groups. As shown in FIG. 4, the 3×3 polygonal low-resolution image patches 301 may be divided into a 2×2 polygonal shape and classified into a first to a fourth pixel groups 311 to 314.

Then, the processing unit 120 determines the direction categories of the edge directions of the pixel groups among a plurality of preset direction categories (S232).

At this time, the processing unit 120 may use an edge filter including a vertical pixel conversion matrix V and a horizontal pixel conversion matrix H as shown in FIG. 5 to determine the direction categories of the pixel groups.

Figure 6:
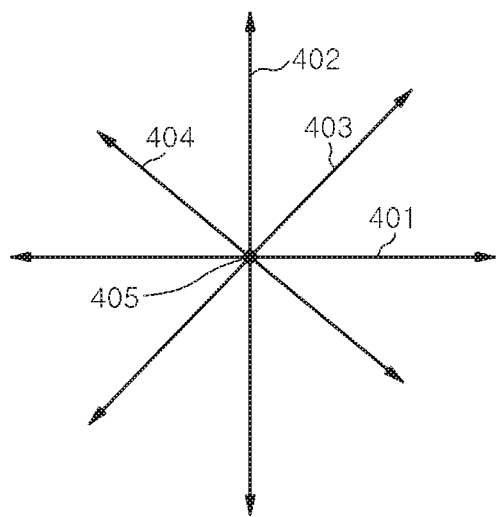
FIG. 6 shows direction categories classified by using the edge direction information in accordance with the embodiment of the present invention.

Further, the processing unit 120 can determine direction categories of edge direction components of the pixel groups by using the vertical pixel conversion matrix V and the horizontal pixel conversion matrix H while setting five direction categories as shown in FIG. 6.

The five direction categories may contain a horizontal category 401, a vertical category 402, a first diagonal category 403 traversing a first quadrant and a third quadrant on an orthogonal coordinate plane having a horizontal direction and a vertical direction orthogonal to each other, a second diagonal category 404 traversing a second quadrant and a fourth quadrant on the orthogonal coordinate plane, and a non-directional category 405 having no directionality.

The processing unit 120 may use a preset threshold value when determining the direction categories of the pixel groups. A magnitude value and an angle value of the edge direction are calculated. When the magnitude value is smaller than the preset threshold value, the direction category may be determined to be the non-directional category 405. On the contrary, when the magnitude value is greater than or equal to the threshold value, the direction category may be determined among the horizontal category 401, the vertical category 402, the first diagonal category 403 and the second diagonal category 404 depending on the angle value.

The following Eq. 1 shows a process of calculating a magnitude value $m_{11}$ and an angle value $d_{11}$ of an edge direction of the first pixel group 311 expressed as a matrix $P_{12}$ by the processing unit 120.

$$m_{11} = \sqrt{\langle P_{11} \circ V \rangle^2 + \langle P_{11} \circ H \rangle^2} \qquad (Eq.\ 1)$$
$$= \sqrt{(P_{11} + P_{12} - P_{21} - P_{22})^2 + (-P_{11} + P_{12} - P_{21} + P_{22})^2}$$

$$P_{11} = \begin{bmatrix} P_{11} & P_{12} \\ P_{21} & P_{22} \end{bmatrix}$$

$$d_{11} = \tan^{-1}\frac{\langle P_{11} \circ V \rangle}{\langle P_{11} \circ H \rangle} = \tan^{-1}\frac{(P_{11} + P_{12} - P_{21} - P_{22})}{(-P_{11} + P_{12} - P_{21} + P_{22})}$$

The following Eq. 2 shows a process of calculating a magnitude value $m_{12}$ and an angle value $d_{12}$ of an edge direction of the second pixel group 312 expressed as a matrix $P_{12}$ by the processing unit 120.

$$m_{12} = \sqrt{\langle P_{12} \circ V \rangle^2 + \langle P_{12} \circ H \rangle^2} \qquad (Eq.\ 2)$$
$$= \sqrt{(P_{12} + P_{13} - P_{22} - P_{23})^2 + (-P_{12} + P_{13} - P_{22} + P_{23})^2}$$

$$P_{12} = \begin{bmatrix} P_{12} & P_{22} \\ P_{13} & P_{13} \end{bmatrix}$$

$$d_{12} = \tan^{-1}\frac{\langle P_{12} \circ V \rangle}{\langle P_{12} \circ H \rangle}$$
$$= \tan^{-1}\frac{(P_{12} + P_{13} - P_{22} - P_{23})}{(-P_{12} + P_{13} - P_{22} + P_{23})}$$

The following Eq. 3 shows a process of calculating a magnitude value $m_{21}$ and an angle value $d_{21}$ of an edge direction of the third pixel group 313 expressed as a matrix $P_{21}$ by the processing unit 120.

$$m_{21} = \sqrt{\langle P_{21} \circ V \rangle^2 + \langle P_{21} \circ H \rangle^2} \qquad (Eq.\ 3)$$
$$= \sqrt{(P_{21} + P_{22} - P_{31} - P_{32})^2 + (-P_{21} + P_{22} - P_{31} + P_{32})^2}$$

$$P_{21} = \begin{bmatrix} P_{21} & P_{22} \\ P_{31} & P_{32} \end{bmatrix}$$

$$d_{21} = \tan^{-1}\frac{\langle P_{21} \circ V \rangle}{\langle P_{21} \circ H \rangle}$$
$$= \tan^{-1}\frac{(P_{21} + P_{22} - P_{31} - P_{32})}{(-P_{21} + P_{22} - P_{31} + P_{32})}$$

The following Eq. 4 shows a process of calculating a magnitude value $m_{22}$ and an angle value $d_{22}$ of an edge direction of the third pixel group 314 expressed as a matrix $P_{22}$ by the processing unit 120.

$$m_{22} = \sqrt{\langle P_{22} \circ V \rangle^2 + \langle P_{22} \circ H \rangle^2} \qquad (Eq.\ 4)$$
$$= \sqrt{(P_{22} + P_{23} - P_{32} - P_{33})^2 + (-P_{22} + P_{23} - P_{32} + P_{33})^2}$$

$$P_{22} = \begin{bmatrix} P_{22} & P_{23} \\ P_{32} & P_{33} \end{bmatrix}$$

$$d_{22} = \tan^{-1}\frac{\langle P_{22} \circ V \rangle}{\langle P_{22} \circ H \rangle}$$
$$= \tan^{-1}\frac{(P_{22} + P_{23} - P_{32} - P_{33})}{(-P_{22} + P_{23} - P_{32} + P_{33})}$$

After the magnitude values and the angle values of the edge directions are calculated by the above Eqs. 1 to 4, the processing unit 120 compares the magnitude values with the preset threshold value. When the calculated magnitude value is smaller than the preset threshold value, the edge direction is determined to be the non-directional category 405 and an index is set to "0".

However, when the calculated magnitude value is greater than or equal to the preset threshold value, the processing unit 120 can determine the direction category among the horizontal category 401, the vertical category 402, the first diagonal category 403 and the second diagonal category 404 depending on the angle value. For example, when a condition "−22.5≤angle value<22.5" is satisfied, the direction category is determined to be the horizontal category 401 and the index is set to "1". When a condition "22.5≤angle value<67.5" is satisfied, the direction category is determined to be the first diagonal category 403 and the index is set to "2". When a condition "67.5≤angle value<112.5" is satisfied, the direction category is determined to be the vertical category 402 and the index is set to "3". When a condition "112.5≤angle value<157.5" is satisfied, the direction category is determined to be the second diagonal category 404 and the index is set to "4".

Next, the processing unit 120 classifies the low-resolution image patches into one of the plurality of image categories based on the determined direction categories of the pixel groups (S233).

FIG. 4 shows an example in which indices of the first to the fourth pixel group 311 to 314 are set to "3", "2", "1" and "2", respectively. The processing unit classifies the low-resolution image patches into an image category corresponding to class 288 among 625 image categories by using a quinary notation.

Next, the processing unit 120 generates a plurality of high-resolution image patches having L (L being a natural number) number of pixels, which is less than the N number of pixels, by converting the plurality of low-resolution image patches by using a conversion kernel for each image patch corresponding to its image category among a plurality of prestored conversion matrices (S240).

Figure 7:
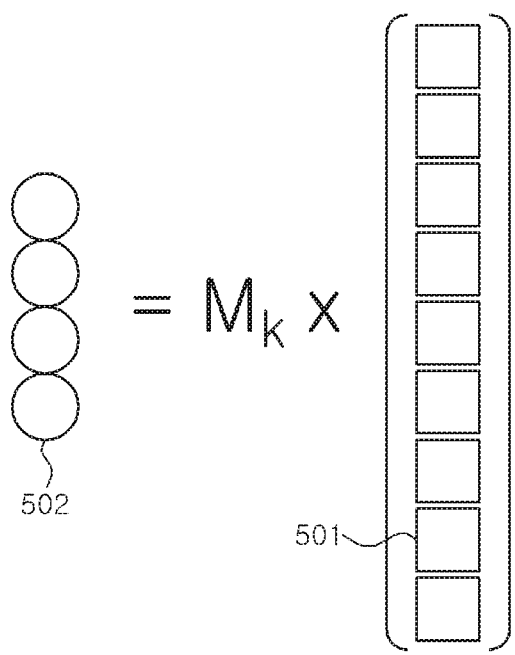
FIG. 7 shows a process of converting low-resolution image patches to high-resolution image patches by applying a conversion kernel to the low-resolution image patches in accordance with the embodiment of the present invention.

FIG. 7 shows the case of generating 2×2 polygonal high-resolution image patches 502 by converting the 3×3 polygonal low-resolution image patches 501 using the $k^{th}$ conversion kernel $M_k$ corresponding to the $k^{th}$ image category.

When the processing unit 120 converts a plurality of low-resolution image patches by using a conversion kernel for each image patch corresponding to its image category among a plurality of prestored conversion matrices, a linear conversion matrix or a non-linear conversion matrix may be used as the conversion kernel. The size of the low-resolution image patches used by the conversion kernel may be the original size before the expansion. The plurality of conversion kernels used by the processing unit 120 may be obtained by a separate training process.

The processing unit 120 can calculate a plurality of conversion kernels through training using pairs of training image patches corresponding to the low-resolution image patches and correct image patches corresponding to the high-resolution image patches. The size of the training image patch used by the pressing unit 120 may be the original size before the expansion. The original size before the expansion may indicate that the interpolation process has not been performed. However, if a certain increase in the amount of operations is allowable, the interpolation process may be performed on the low-resolution image patches.

The processing unit 120 can calculate pixel values of the high-resolution image patches by multiplying linear conversion matrices of integer values to the low-resolution image patches and performing bit shift operations.

For example, a look-up table in which the plurality of image categories are made to correspond one-to-one to the conversion kernels is prestored in an external memory. The processing unit 120 can calculate the pixel values of the high-resolution image patches by reading out the conversion kernels corresponding to the image categories of the low-resolution image patches from the external memory and performing the multiplying operation using the read-out conversion kernels and the bit shift operation. In the case of using the non-linear conversion matrix, the low-resolution image patches can be converted to the high-resolution image patches through preprocessing such as noise reduction, color space conversion or the like and then MLP (Multi-layer Perceptron) mapping. For example, information on the number of shift bits for the bit shift operation may be stored in the external memory. The processing unit 120 can perform the bit shift operation based on the above information.

Then, the processing unit 120 generates a high-resolution image by arranging the plurality of high-resolution image patches without overlapping.

When the N number of pixels included in the low-resolution image patches are superimposed over the high-resolution image, the L number of pixels included in the high-resolution image patches can be arranged around the central pixel among the N number of pixels.

Figures 8A, 8B, 8C:
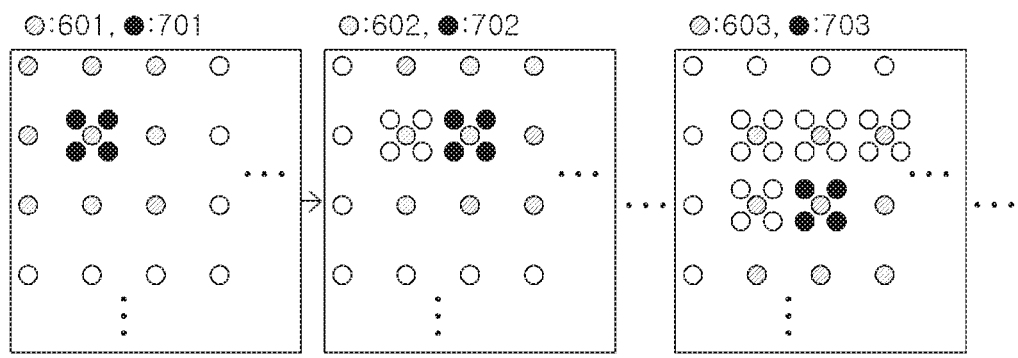
FIG. 8 shows a process of generating a high-resolution image by arranging a plurality of high-resolution image patches in accordance with the embodiment of the present invention.

FIGS. 8A to 8C show a process of generating a high-resolution image by arranging a plurality of high-resolution image patches. Referring to FIG. 8A, first high-resolution image patches 701 generated by converting first low-resolution image patches 601 are arranged. Referring to FIG. 8B, second high-resolution image patches 702 generated by converting second low-resolution image patches 602 are arranged. Referring to FIG. 8C, third high-resolution image patches 703 generated by converting third low-resolution image patches 603 are arranged. As shown in FIGS. 8A to 8C, in the first to the third high-resolution image patches 701 to 703, pixels are not overlapped between high-resolution image patches adjacent to each other. In the same manner, in high-resolution image patches to be arranged later, pixels are not overlapped between high-resolution image patches adjacent to each other.

Next, the output unit 130 of the image conversion apparatus 100 outputs the high-resolution image generated by the processing unit 120 (S250). For example, the output unit 130 can output the high-resolution image in the form of data stream through various communication interfaces such as a serial port, a USB port and the like or can display the high-resolution image on a screen.

In accordance with the embodiments of the present invention, a low-resolution image is directly converted to a high-resolution image without an interpolation process for a low-resolution image and repetitive image quality improving processes. Therefore, the operation amount is reduced compared to the conventional technique in which the interpolation process is required. Accordingly, the technique of the present invention can be implemented in a hardware having low complexity.

Since the low-resolution image is classified into the plurality of image categories based on the characteristic information and then converted to the high-resolution image by using an integer conversion kernel selected for each category, the amount of operations can be further reduced.

When generating the high-resolution image by arranging a plurality of high-resolution image patches, by arranging the high-resolution image patches adjacent to each other so as not to overlap, an additional operation such as a calculation of pixel values for an overlapping region or the like is not required. Accordingly, the amount of operations amount can be further reduced.

Since the low-resolution image is classified into the plurality of image categories based on the characteristic information and then converted to the high-resolution image by using the conversion kernel selected for each image category, the high-resolution image having a high quality can be generated regardless of the characteristic information of the image signal.

The combinations of respective steps of the flowchart attached herein may be carried out by computer program instructions. Since the computer program instructions may be executed by processors of a general purpose computer, a special purpose computer, or other programmable data processing apparatus, the instructions, executed by the processor of the computers or other programmable data processing apparatus, create means for performing functions described in the respective steps of the sequence diagram. These computer program instructions may also be stored in a computer usable memory or a computer readable memory to implement fuctions in a specific manner, so that the instructions stored in the computer usable memory or the computer readable memory may produce manufacturing items including an instruction means for performing functions described in the respective steps of the sequence diagram. Since the computer program instructions may be loaded by a computer or other programmable data processing apparatus, instructions, a series of steps of which are executed in the computer or other programmable data processing apparatus to create processes executed by a computer to operate the computer or other programmable data processing apparatus, may provide operations for executing functions described in the respective steps of the flow diagram.

Each step in the flowchart may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved.

The explanation as set forth above merely provides a technical idea of the present invention, and it will be understood by those skilled in the art to which the present invention belongs that various changes and modifications may be made without departing from the scope of the characteristics of the present invention. Therefore, the disclosed embodiments are not used to limit the technical idea of the present invention, but to explain the present invention, and the scope of the technical idea of the present invention is not limited to these embodiments. The scope of protection of the present invention should be construed as defined in the following claims, and all technical ideas that fall within the equivalent technical idea of the present invention are intended to be embraced by the scope of protection of the present invention.

What is claimed is:

1. An image conversion method using an image conversion device for converting a low-resolution image to a high-resolution image having a higher resolution than the low-resolution image, the method comprising:

generating a plurality of low-resolution image patches including N (N being a natural number of 2 or greater) number of pixels by dividing the low-resolution image;

classifying the plurality of low-resolution image patches into a plurality of image categories;

converting the plurality of low-resolution image patches to a plurality of high-resolution image patches using a plurality of conversion kernels corresponding to the plurality of image categories among a plurality of prestored conversion matrices, the plurality of high-resolution image patches including L (L being a natural number) number of pixels, which is less than the N number of pixels;

generating the high-resolution image by arranging the plurality of high-resolution image patches; and outputting the generated high-resolution image.

2. The image conversion method of claim 1, wherein in said classifying the plurality of low-resolution image patches, the plurality of low-resolution image patches are classified by using at least one information among an edge direction, an edge intensity, a texture, a brightness, a first- or higher-order differential signal, a color, a type of an object, and a frequency of the low-resolution image patches.

3. The image conversion method of claim 2, wherein said classifying the plurality of low-resolution image patches includes:

classifying the N number of pixels included in the low-resolution image patches into a plurality of pixel groups;

determining a direction category of an edge direction of each of the pixel groups among a plurality of preset direction categories; and classifying the low-resolution image patches into one of the plurality of image categories based on the determined direction categories of the pixel groups.

4. The image conversion method of claim 3, wherein some of the N number of pixels are duplicately classified into different pixel groups among the plurality of pixel groups.

5. The image conversion method of claim 3, wherein in said determining a direction category, an edge filter is used.

6. The image conversion method of claim 5, wherein the edge filter includes a vertical pixel conversion matrix and a horizontal pixel conversion matrix.

7. The image conversion method of claim 6, wherein in said determining a direction category, the direction category is determined among a horizontal category, a vertical category, a first diagonal category traversing a first quadrant and a third quadrant on an orthogonal coordinate plane including a horizontal direction and a vertical direction orthogonal to each other, a second diagonal category traversing a second quadrant and a fourth quadrant on the orthogonal coordinate plane, and a non-directional category with no directionality by using the vertical pixel conversion matrix and the horizontal pixel conversion matrix.

8. The image conversion method of claim 7, wherein in said determining a direction category, a magnitude value and an angle value of the edge direction are calculated and, then, the direction category is determined to be the non-directional category when the magnitude value is smaller than a preset threshold value and determined among the horizontal category, the vertical category, the first diagonal category and the second diagonal category depending on the angle value when the magnitude value is greater than or equal to the threshold value.

9. The image conversion method of claim 8, wherein in said classifying the plurality of low-resolution image patches, the N number of pixels are classified into a first to a fourth pixel group; the direction categories of the first to the fourth pixel group are determined; and the low-resolution image patches are classified into one of 625 image categories by using a quinary notation.

10. The image conversion method of claim 1, wherein a size of the low-resolution image patches to be converted is an original size before expansion.

11. The image conversion method of claim 1, wherein the plurality of conversion kernels is calculated by using pairs of training image patches corresponding to the low-resolution image patches and correct image patches corresponding to the high-resolution image patches,
wherein a size of the training image patches is an original size before expansion.

12. The image conversion method of claim 1, wherein the plurality of conversion kernels is a linear conversion matrix or a non-linear conversion matrix.

13. The image conversion method of claim 12, wherein in said generating the plurality of high-resolution image patches, pixel values of the high-resolution image patches are calculated by multiplying the linear conversion matrices of integer values to the low-resolution image patches and performing bit shift operations.

14. The image conversion method of claim 1, wherein in said generating the high-resolution image, when the N number of pixels included in the low-resolution image patches are superimposed over the high-resolution image, the L number of pixels included in the high-resolution image patches are arranged around a central pixel among the N number of pixels.

15. The image conversion method of claim 14, wherein in said generating the high-resolution image, when the N is 9 and the L is 4, the low-resolution image patches is represented by a 3×3 polygonal shape and the high-resolution image patches is represented by a 2×2 polygonal shape.

16. The image conversion method of claim 1, wherein in said generating the high-resolution image, the high-resolution image is generated by arranging the plurality of high-resolution image patches without overlapping.

17. A non-transitory computer-readable storage medium storing instructions thereon to convert a low-resolution image to a high-resolution image having a higher resolution than the low-resolution image, the instructions when executed by a processor cause the processor to:
generate a plurality of low-resolution image patches including N (N being a natural number of 2 or greater) number of pixels by dividing the low-resolution image;
classify the plurality of low-resolution image patches into a plurality of image categories;
convert the plurality of low-resolution image patches to a plurality of high-resolution image patches using a plurality of conversion kernels corresponding to the plurality of image categories among a plurality of pre-stored conversion matrices, the plurality of high-resolution image patches including L (L being a natural number) number of pixels, which is less than the N number of pixels;
generate the high-resolution image by arranging the plurality of high-resolution image patches; and
outputting the generated high-resolution image.

18. An image conversion device for converting a low-resolution image to a high-resolution image having a higher resolution than the low-resolution image, the device comprising:
an input device into which the low-resolution image is inputted;
a processor configured to generate the high-resolution image by converting the inputted low-resolution image; and
an output device configured to output the generated high-resolution image,
wherein the processor is further configured to:
generate a plurality of low-resolution image patches including an N (N being a natural number of 2 or greater) number of pixels by dividing the low-resolution image,
classify the plurality of low-resolution image patches into a plurality of image categories,
convert the plurality of low-resolution image patches to a plurality of high-resolution image patches using a plurality of conversion kernels corresponding to the plurality of image categories among a plurality of pre-stored conversion matrices, and
generate the high-resolution image by arranging the plurality of high-resolution image patches,
wherein the plurality of high-resolution image patches include an L (L being a natural number) number of pixels, which is less than the N number of pixels.

19. The image conversion device of claim 18, wherein the processor is further configured to generate the high-resolution image by arranging the plurality of high-resolution image patches without overlapping.

* * * * *